United States Patent
Ruopp

(10) Patent No.: US 8,925,314 B2
(45) Date of Patent: Jan. 6, 2015

(54) MASTER CYLINDER

(75) Inventor: Michael Ruopp, Berghülen (DE)

(73) Assignee: Gustav Magenwirth GmbH & Co. KG, Bad Urach (DE)

( * ) Notice: Subject to any disclaimer, the term of this patent is extended or adjusted under 35 U.S.C. 154(b) by 0 days.

(21) Appl. No.: 13/159,948

(22) Filed: Jun. 14, 2011

(65) Prior Publication Data

US 2011/0296827 A1 Dec. 8, 2011

Related U.S. Application Data

(63) Continuation of application No. PCT/EP2009/067205, filed on Dec. 15, 2009.

(30) Foreign Application Priority Data

Dec. 16, 2008 (DE) .......................... 10 2008 063 241

(51) Int. Cl.
- *B60T 11/16* (2006.01)
- *B60T 11/232* (2006.01)
- *B60T 11/236* (2006.01)

(52) U.S. Cl.
CPC ............ *B60T 11/232* (2013.01); *B60T 11/236* (2013.01)
USPC ........................................................ 60/588

(58) Field of Classification Search
USPC ........................................................ 60/588
See application file for complete search history.

(56) References Cited

U.S. PATENT DOCUMENTS

| | | | | |
|---|---|---|---|---|
| 5,036,664 A | * | 8/1991 | Camm ............................. | 60/588 |
| 6,550,246 B2 | * | 4/2003 | Barr et al. ....................... | 60/588 |
| 7,104,059 B2 | * | 9/2006 | Tsubouchi et al. ............. | 60/588 |
| 7,181,911 B2 | * | 2/2007 | Ishikawa et al. ................ | 60/588 |
| 8,109,088 B2 | * | 2/2012 | Grech et al. .................... | 60/588 |
| 2006/0064978 A1 | | 3/2006 | Mouri et al. | |
| 2007/0068154 A1 | | 3/2007 | Bernadat et al. | |
| 2008/0087016 A1 | | 4/2008 | Shepherd et al. | |
| 2008/0289329 A1 | | 11/2008 | Gaffe et al. | |

FOREIGN PATENT DOCUMENTS

| | | |
|---|---|---|
| DE | 19754700 A1 | 6/1999 |
| DE | 102004055410 A1 | 8/2005 |

(Continued)

*Primary Examiner* — F. Daniel Lopez
(74) *Attorney, Agent, or Firm* — Reinhart Boerner Van Deuren P.C.

(57) ABSTRACT

In order to make the idle stroke which occurs as small as possible in a master cylinder, in particular for a clutch, actuating or brake system of a vehicle, comprising a cylinder housing with a piston bore, a piston arranged in the piston bore and having an end side facing a cylinder chamber and at least one afterflow opening which leads from a piston skirt surface through a piston wall to the cylinder chamber at a distance from the end side and adjoins an afterflow space in a pressure equalization position of the piston so that in the pressure equalization position hydraulic medium can run on into the cylinder chamber in order to equalize the pressure, and an inner sealing element which is arranged between the housing and the piston in the area of the piston bore and limits the cylinder chamber, it is suggested that the afterflow space be arranged between the sealing element and the piston skirt surface on a side of a sealing lip of the sealing element facing away from the cylinder chamber and that in the pressure equalization position the afterflow opening be arranged so as to be located opposite an inner surface of the sealing element limiting the afterflow space.

20 Claims, 16 Drawing Sheets

(56) References Cited

FOREIGN PATENT DOCUMENTS

| EP | 1 616 768 | A1 | 1/2006 |
|----|-----------|----|--------|
| EP | 1767423   | A1 | 3/2007 |
| EP | 1801423   | A2 | 6/2007 |
| EP | 1995138   | A1 | 11/2008 |
| FR | 2869381   | A1 | 10/2005 |

\* cited by examiner

MASTER CYLINDER

CROSS-REFERENCE TO RELATED PATENT APPLICATIONS

This application is a continuation of international application number PCT/EP2009/067205 filed on Dec. 15, 2009.

This patent application claims the benefit of International application No. PCT/EP2009/067205 of Dec. 15, 2009 and German application No. 10 2008 063 241.4 of Dec. 16, 2008, the teachings and disclosure of which are hereby incorporated in their entirety by reference thereto.

BACKGROUND OF THE INVENTION

The invention relates to a master cylinder, in particular for a clutch, actuating or brake system of a vehicle, comprising a cylinder housing with a piston bore, a piston which is arranged in the piston bore and has an end side facing a cylinder chamber and at least one afterflow opening which leads from a piston skirt surface through a piston wall to the cylinder chamber at a distance from the end side and adjoins an afterflow space in a pressure equalization position of the piston so that in the pressure equalization position hydraulic medium can run on into the cylinder chamber in order to equalize the pressure, and an inner sealing element which is arranged between the housing and the piston in the area of the piston bore and limits the cylinder chamber.

DE 10 2004 055 410 discloses a master cylinder of this type, wherein the piston of this master cylinder must pass through a considerable distance in order to be able to build up pressure in the cylinder chamber from the pressure equalization position.

The problem with such master cylinders is to make the idle stroke which occurs as small as possible. The idle strike is the stroke which is necessary in order to be able to build up pressure in the cylinder chamber proceeding from the pressure equalization position.

SUMMARY OF THE INVENTION

This object is accomplished in accordance with the invention, in a master cylinder of the type described at the outset, in that the afterflow space is arranged between the sealing element and the piston skirt surface on a side of a sealing lip of the sealing element facing away from the cylinder chamber and that in the pressure equalization position the afterflow opening is arranged so as to be located opposite an inner surface of the sealing element which limits the afterflow space.

The advantage of the solution according to the invention is to be seen in the fact that it is possible, as a result of moving the afterflow space into an area between the sealing element and the piston skirt surface, to position the at least one afterflow opening in the pressure equalization position such that it passes through below the sealing lip, which abuts sealingly on the piston skirt surface, with even a slight stroke movement of the piston and, therefore, pressure can be built up in the cylinder chamber.

As a result, the idle stroke is minimized in accordance with the object described at the outset.

In this respect, it is particularly favorable when the sealing element has inner surface areas extending at a distance from the piston skirt surface for the formation of the afterflow space.

Such inner surface areas extending at a distance from the piston skirt surface create the possibility of providing a sufficiently large volume for the afterflow space.

One advantageous solution provides for the inner surface areas to form a cavity which extends around the piston skirt surface and can, for example, be worked into the sealing element as an annular groove.

Such a cavity creates the possibility of communicating with a plurality of afterflow openings in the piston so that a sufficiently large afterflow cross section can be made available.

Another advantageous solution provides for the inner surface areas to form overflow channels which lead to a side of the sealing element which faces away from the cylinder chamber. Overflow channels of this type offer the possibility not only of providing as large a volume as possible for the afterflow space but also of providing a sufficiently large flow cross section for the hydraulic medium to run on.

The overflow channels could extend, for example, spirally or helically in the sealing element.

One particularly favorable solution provides, however, for the overflow channels to extend approximately parallel to a direction of movement of the piston.

In order, on the one hand, to ensure the supply of hydraulic medium to the afterflow space and in order, on the other hand, to bring about a reliable discharge of air bubbles from the afterflow space, it is provided for the afterflow space to lie adjacent to at least one supply recess, via which hydraulic medium can be supplied to the afterflow space and via which air bubbles can also exit from the afterflow space.

It is provided, in particular, for the supply recess to vary in a radial direction towards the afterflow space.

A feeding of hydraulic medium to the afterflow space can be realized favorably, in particular, when the supply recess is in communication with a supply channel.

It is particularly favorable when the afterflow space lies adjacent to a supply gap which is located between the piston skirt surface and the piston bore and via which the hydraulic medium can flow on into the afterflow space.

The supply gap can be of a cylindrical design. It is particularly favorable when the supply gap widens in a radial direction towards the afterflow space.

One particularly simple solution provides for the supply gap to widen conically.

The supply gap can widen in the direction of the afterflow space at an angle of between 0.5° and 45°. It is particularly favorable when the angle is in the range of 1° to 8°.

The supply gap preferably has a radial extension in the range of 0.01 mm and 0.5 mm.

Furthermore, the supply gap preferably has a gap length extending parallel to a direction of movement of the piston of 0.1 mm to 10 mm.

Alternatively to the provision of a supply gap, it is possible to provide at least one supply section in a wall area between the afterflow space and the supply channel or a hydraulic chamber.

Preferably, a plurality of supply sections which are arranged at a distance from one another will be provided in the wall area.

The at least one supply section is, in particular, dimensioned such that its radial extent becomes increasingly smaller with increasing extension in the direction of the afterflow space and so as small a gap as possible in relation to the piston skirt surface exists on the side of the afterflow space.

In this respect, the overflow channels form, in particular, a connection between the cavity and the supply recess.

The hydraulic medium may be supplied to the supply gap particularly favorably when the gap communicates with a supply channel, wherein the supply channel is arranged, for example, on a side of the supply recess which is located opposite the sealing element and preferably opens into the piston bore with a supply opening which faces the piston skirt surface.

With respect to the design of the sealing element itself, no further details have so far been given.

One advantageous solution provides, for example, for the sealing element to have an annular base member.

Furthermore, the sealing element is preferably designed such that a supporting lip which is located radially outwards extends from the annular base member in the direction of the cylinder chamber.

Furthermore, the seal in relation to the piston skirt surface is preferably brought about in that a sealing lip which is located radially inwards extends from the base member in the direction of the cylinder chamber and abuts on the piston skirt surface.

In order to achieve a good seal, the sealing lip which is located radially inwards is preferably of a flexible design.

In this respect, the sealing lip is preferably designed such that it abuts on the piston skirt surface radially inwards with pretensioning.

With respect to the arrangement of the afterflow space in the case of a sealing element designed in such a manner, no further details have so far been given.

It is particularly advantageous when the afterflow space arranged between the sealing element and the piston surface extends in the area of the base member of the sealing element.

Furthermore, it is favorable when the afterflow space extends as far as the sealing lip.

Furthermore, with respect to the sealing lip only its sealing function relative to the piston skirt surface has been mentioned.

In order make a fast follow-up flow of hydraulic medium from the afterflow space into the cylinder chamber possible in the case of any extreme underpressure in the cylinder chamber, it is preferably provided for the sealing lip to have such a pretensioning that it allows hydraulic medium to flow through from the afterflow space to the cylinder chamber by at least partially lifting away from the piston skirt surface in the case of any underpressure in the cylinder chamber.

The piston is designed, in particular, such that it has a piston skirt surface which is cylindrical in relation to a central axis and extends with a constant cross section over the entire area of the piston which can be touched by the seal in all the positions of the piston.

With respect to the individual positions of the piston, no further details have so far been given.

One advantageous solution provides, for example, for the piston to be positioned in a closed position with the afterflow openings at such a distance from the pressure equalization position that the afterflow openings are covered by the sealing surface of the inner sealing lip and, therefore, no more equalization of pressure between the cylinder chamber and the afterflow space can take place.

Furthermore, it is advantageously provided for the piston to be displaced, in a pressure position, to such an extent in the direction of the cylinder chamber that the at least one afterflow opening is located on a side of the sealing lip facing the cylinder chamber and so, as a result, no equalization of pressure whatsoever can take place via the afterflow opening but rather the sealing lip, by resting on the unbroken piston skirt surface, abuts sealingly on it.

It is particularly favorable when a gap is present between an inner surface of the cylinder chamber and the piston skirt surface when the piston is in the pressure position and separates an annular chamber of the cylinder chamber, which adjoins the sealing element, from a variable volume area of the cylinder chamber.

Such a gap has the advantage that pressure pulsations which can propagate as far as into the variable volume area of the cylinder chamber merely have an effect in the annular chamber of the cylinder chamber which is damped or even better essentially not as fluctuations in pressure and, therefore, the sealing element can be protected from such pulsating fluctuations in pressure in the pressure position.

Such pressure pulsations can occur in clutch or unregulated brake systems; such pressure pulsations do, however, occur, in particular, in regulated brake systems, for example with ABS and/or ESC.

In this respect, it is particularly favorable when the gap between the wall surface of the cylinder chamber and the piston skirt surface is minimal in all the positions of the piston between the pressure position and the closed position.

The gap has a radial gap measurement which is, for example, in a range of 0.01 mm to 0.5 mm and a gap length extending parallel to a direction of movement of the piston of 0.1 mm to 10 mm.

Alternatively or in addition to the embodiments of the solution according to the invention described above, the object specified at the outset is also accomplished in accordance with the invention by a master cylinder of the type described at the outset in that the sealing element can be inserted into the cylinder housing from an outer opening thereof.

The advantage of this solution is to be seen in the fact that, as a result, the installation of the sealing element is made easier, in particular the installation of a sealing element according to one or several of the preceding features.

In this respect, it is particularly advantageous when the cylinder housing has a bore which lies adjacent to the outer opening, reaches as far as a base of a receiving groove for the sealing element and through which the sealing element can be inserted.

Such a bore which reaches as far as the base of the groove has the advantage that, as a result, it is not necessary to deform the sealing element to any great extent during its insertion into the housing but rather the sealing element can be inserted into the housing essentially undeformed.

In this respect, it is even more advantageous when the bore which lies adjacent to the outer opening has at least one cross sectional surface which corresponds to a cross sectional surface of the base of the groove and so the cross sectional surface of the bore either has the same cross section as the base of the groove or is larger and, therefore, the sealing element can be inserted into the groove in a particularly easy manner.

One expedient solution provides for an insert which fixes the sealing element in place to be insertable into the cylinder housing. Such an insert has the advantage that it is possible, as a result, to fix the sealing element in place.

The insert is preferably designed such that it forms a groove wall in the state inserted into the cylinder housing and, therefore, fixes the sealing element in place in the receiving groove.

In this respect, it is expediently provided for an additional groove wall which is not formed by the insert to be provided in the cylinder housing, this wall preferably being located opposite the groove wall formed by the insert.

Furthermore, the base of the groove is preferably provided in the cylinder housing.

A master cylinder according to the invention can, in principle, be used for any type of clutch, actuating and brake system.

Special advantages do, however, result when the master cylinder interacts with a regulated clutch, actuating or brake system.

Furthermore, the master cylinder can preferably be actuated by hand or by foot.

In addition, the invention relates to a sealing element which, in accordance with the invention, is designed in accordance with one or several of the preceding features.

Additional features and advantages of the invention are the subject matter of the following description as well as the drawings illustrating several embodiments.

DETAILED DESCRIPTION OF THE INVENTION

Figure 1:
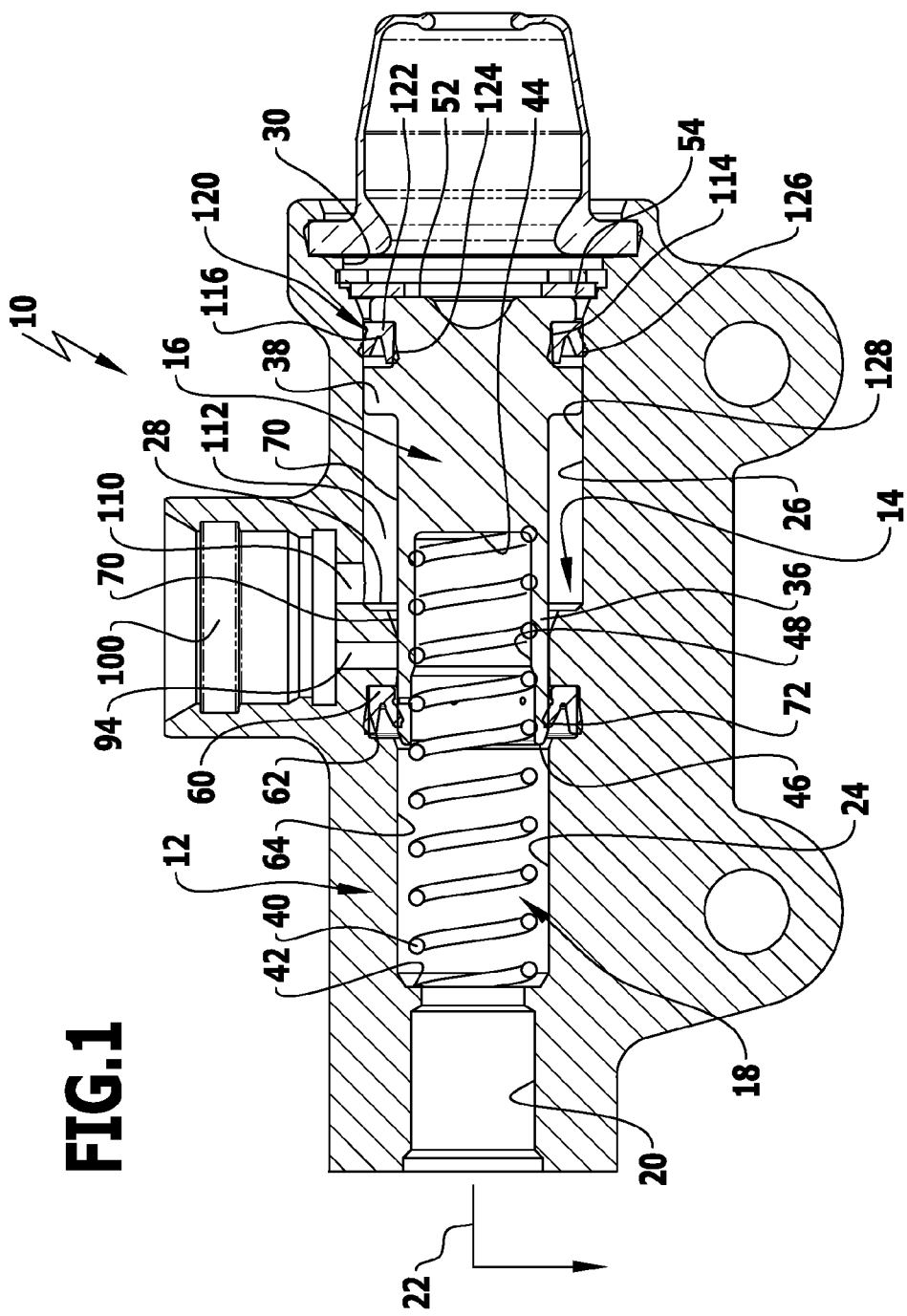
FIG. 1 shows a longitudinal section through a first embodiment of a master cylinder according to the invention in the pressure equalization position.
Figure 2:
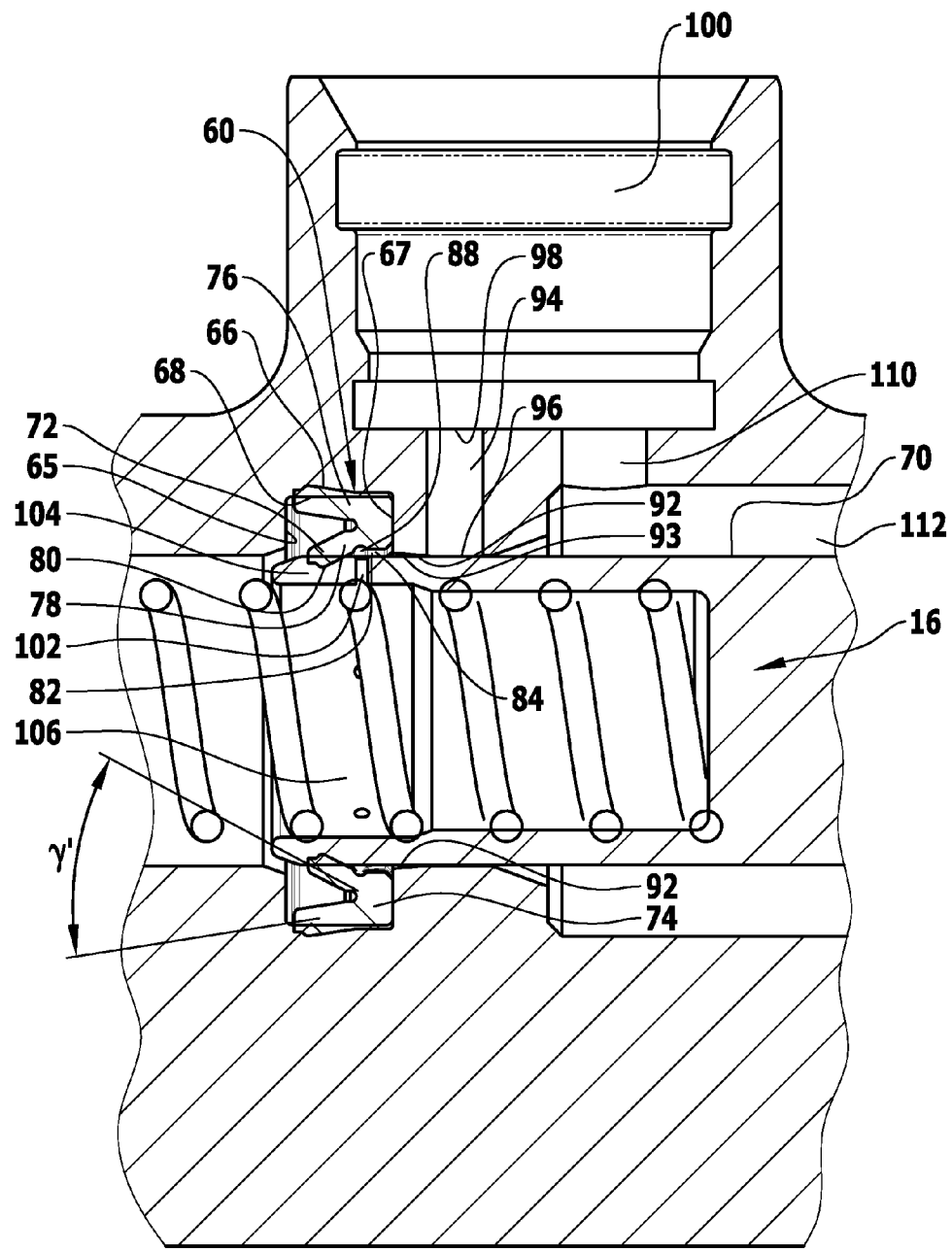
FIG. 2 shows a sectional enlarged illustration of the longitudinal section according to FIG. 1 in the area of a sealing element.

A first embodiment of a master cylinder 10 according to the invention, which is illustrated in FIGS. 1 and 2, in particular a master cylinder for a motor vehicle with a regulated brake system, comprises a cylinder housing which is designated as a whole as 12 and in which a piston bore which is designated as a whole as 14 is provided.

A piston designated as a whole as 16 is arranged in the piston bore 14, wherein the piston 16 subjects a hydraulic medium to pressure which is arranged in a cylinder chamber 18 limited by the piston 16 and the piston bore 14.

For this purpose, a hydraulic connection 20 is provided in the housing 12, this connection opening into the cylinder chamber 18 on a side facing away from the piston 16 and a hydraulic system 22 being connectable to the cylinder chamber 18 via this connection in order to act, for example, on a clutch or brake system, which is not illustrated in detail, with the hydraulic medium subject to pressure via the hydraulic system 22.

The piston bore 14 is preferably configured as a stepped bore and has in the area of the cylinder chamber 18 an inner bore section 24 which has a reduced diameter in relation to an outer bore section 26, wherein the outer bore section 26 merges into the inner bore section 24 with a step 28. The outer bore section 26 extends as far as an outer opening 30, via which the piston 16 can be introduced into the piston bore 14.

The piston 16 has, for its part, an inner piston section 36 which is adapted to the inner bore section 24 with respect to its diameter and an outer piston section 38 which is guided in the outer bore section 26 and adapted to its diameter.

The piston 16 is acted upon altogether by a pressure spring which is designated as a whole as 40, is supported, on the one hand, on an end area 42 of the inner bore section 24 and, on the other hand, on a supporting surface 44 which is provided in the piston 16 and limits a recess 48 which penetrates the inner piston section 36 like a blind-end bore from an inner end side 46 of the piston 16 and in which the pressure spring 40 is guided with its section penetrating the inner piston section 36.

Therefore, the pressure spring 40 always acts on the piston 16 in the direction of a pressure equalization position which defines a maximum volume of the cylinder chamber 18 and in which the piston 16 abuts with an outer end side 52 on a stop element 54, for example a stop ring which is fixed to the cylinder housing 12 in the area of the outer opening 30.

For the purpose of sealing the cylinder chamber 18, a sealing element designated as a whole as 60 is provided which is arranged in a receiving groove 62 of the housing 12 which extends radially outwards into a wall area of the housing 12, which surrounds the bore section 24, as far as a groove base 68 with groove walls 65 and 67, proceeding from an inner surface 64 of the inner bore section 24.

In this respect, the sealing element 60 is arranged such that it abuts sealingly on a piston skirt surface 70, which is rotationally symmetric and cylindrical and has an invariable cross section over a length of the piston 16, in a forward area 72 located close to the inner end side 46 when the piston is in the pressure equalization position.

The sealing element 60 comprises, for its part, as illustrated, in particular, in FIGS. 2 to 5, an annular base member 74, proceeding from which a supporting lip 76 extends which is located radially outwards, wherein the supporting lip 76 as well as the base member 74 abut with outer surfaces 66 on the base 68 of the groove and are supported by it.

Furthermore, a sealing lip 78 extends from the base member 74 preferably at an acute angle in relation to the supporting lip 76, this sealing lip abutting on the forward area 72 of the piston skirt surface 70 with a sealing surface 80 facing the piston 16 when the piston 16 is in the pressure equalization position and terminating sealingly with this piston skirt surface.

Figure 3:
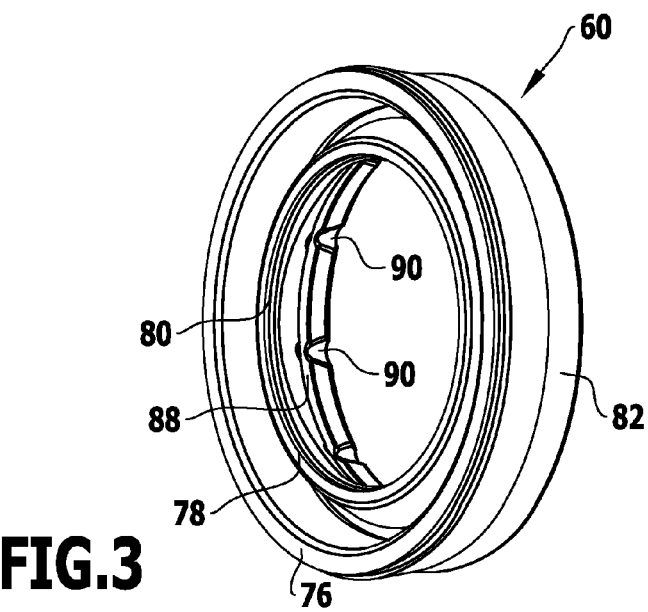
FIG. 3 shows a perspective illustration of a sealing element from the side of the cylinder chamber.
Figure 4:
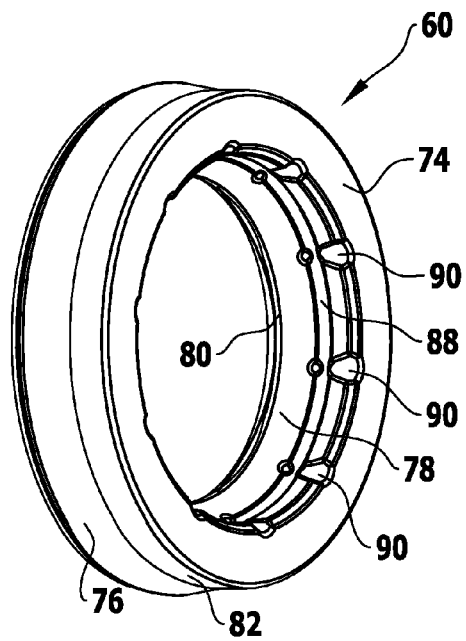
FIG. 4 shows a perspective illustration of the sealing element of a supply gap.
Figure 5:
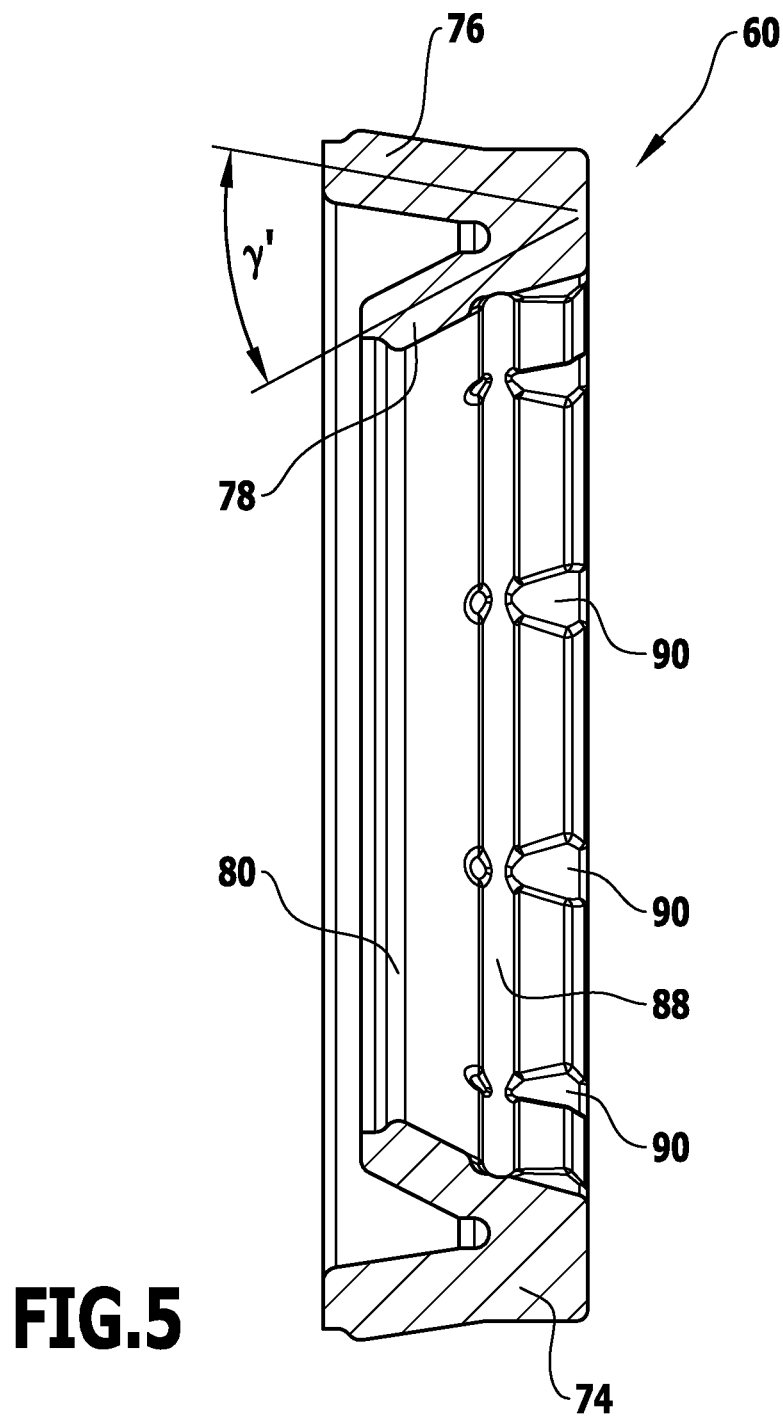
FIG. 5 shows a longitudinal section through the sealing element according to the invention in the disassembled state.

In order to illustrate the construction of the annular sealing element 60, this is illustrated again in detail in FIGS. 3 to 5.

The supporting lip 76 and the sealing lip 78 preferably have a V-shaped alignment relative to one another so that they extend approximately at an angle γ proceeding from the base member 74 in the non-installed state, wherein in the installed state the supporting lip 76 is deformed in the direction of the sealing lip 78 as a result of its abutment on the base 68 of the groove and the sealing lip 78 is deformed in the direction of the supporting lip 76 as a result of its abutment on the piston skirt surface 70 and so an angle γ' between the supporting lip 76 and the sealing lip 78 is smaller in the installed state than the angle γ in the non-installed state of the sealing element 60.

When the sealing element 60 is installed, the base member 74 rises above the base 68 of the groove to such an extent that an afterflow space 84 is formed between the piston skirt surface 70 and the inner surface area 82 of the sealing element 60, in particular of the base member 74, facing away from the base 68 of the groove and facing the piston 16 and this afterflow space extends in the area of the receiving groove 62 from the groove wall 67, which faces away from the cylinder chamber 18, in the direction of the cylinder chamber 18 as far as an annular cavity 88 in the sealing element 60 which is comprised by the inner surface areas 82 and is arranged in a foot area of the supporting lip 76 and approximately between the foot area of the supporting lip 76 and the base member 74 on a side facing the piston skirt surface 70 and which extends in a ring shape around the piston 16 (cf. FIG. 2).

Additional overflow channels 90, which are comprised by the inner surface areas 82 and extend from the annular cavity 88 in the direction of the groove wall 67, lead as well to this cavity 88.

The overflow channels 90 serve the purpose of providing an increased flow cross section for hydraulic medium flowing to the cavity 88 in the area of the afterflow space 84.

Figure 6:
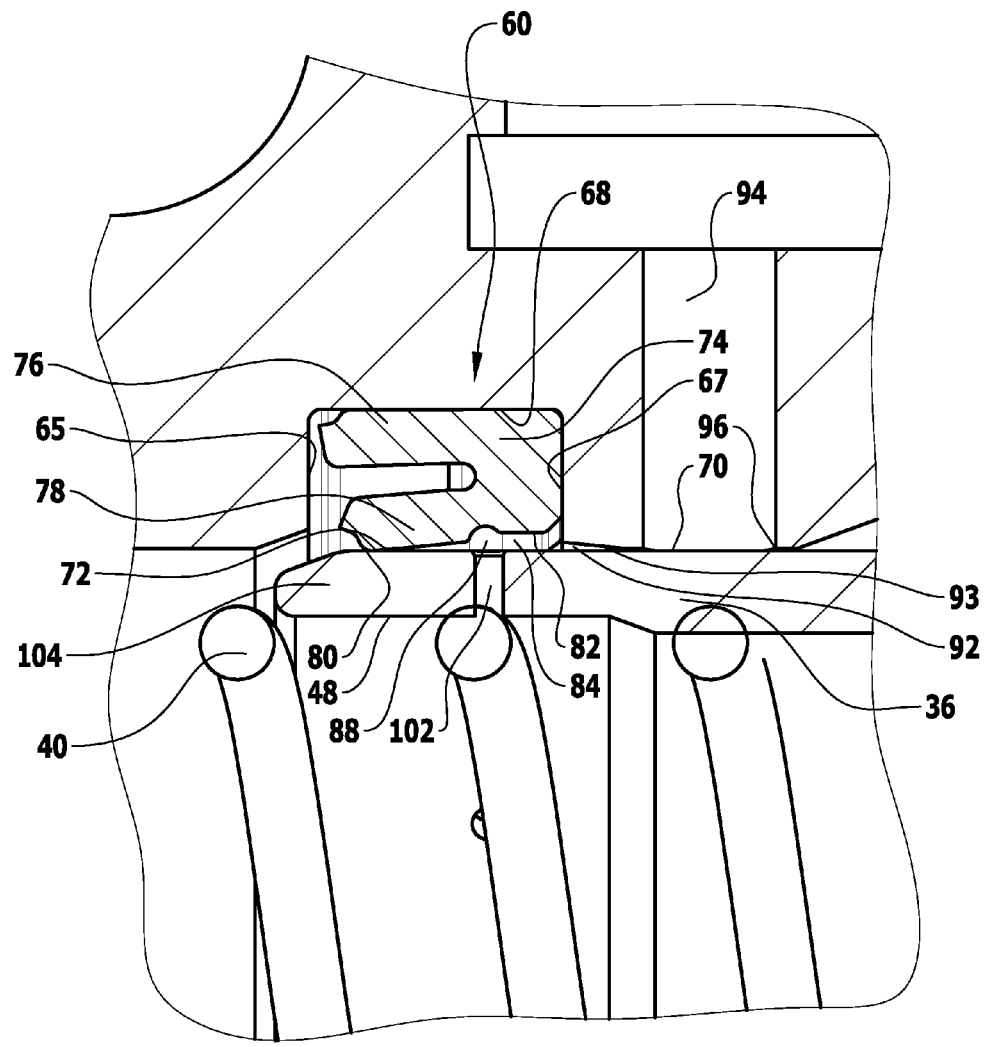
FIG. 6 shows an even more enlarged illustration of the longitudinal section according to FIG. 2 in the area of the sealing element and the supply gap.

The hydraulic medium enters the afterflow space 84, as illustrated in FIG. 2 and FIG. 6, through a supply gap 92 which extends in a wall section 93 of the inner bore section 24 from the groove wall 67 in the direction away from the cylinder chamber 18 as far as a supply channel 94 which has a supply opening 96 facing the piston skirt surface 70 as well as an entry opening 98, via which hydraulic medium provided to a hydraulic connection 100 without pressure can enter the supply channel 94.

The hydraulic medium flows through the supply channel 94 and exits from it through its supply opening 96 which adjoins the piston skirt surface 70 and flows from this supply opening 96 via the supply gap 92 to the afterflow space 84.

The supply gap 92 is preferably designed such that it widens towards the afterflow space 84 proceeding from an area adjoining the supply opening 96, as illustrated in FIG. 6.

In order to have the possibility of being able to compensate for any underpressure occurring in the cylinder chamber 18 due to a loss of hydraulic medium in the hydraulic system 22 in the pressure equalization position of the piston 16 by way of hydraulic medium running on from the afterflow space, the piston 16 is provided in its inner piston section 36 with afterflow bores 102 which pass through a piston wall 104 located between the piston skirt surface 70 and the recess 48 and, therefore, offer the possibility of hydraulic medium being able to enter the cylinder chamber 18 from the afterflow space 84 through these afterflow bores 102, wherein the hydraulic medium enters an inner space 106 of the inner piston section 36 which is encircled by the recess 48 and from there can then pass into the cylinder chamber 18, as illustrated in FIG. 1 and FIG. 2.

The afterflow bores 102, which are preferably distributed over the circumference of the inner piston section 36, are located in the equalization position of the piston 16 such that they open into the afterflow space 84 in the area of the cavity 88 of the sealing element 60 so that the hydraulic medium flowing in via the supply channel 94 enters the afterflow space 84 through the supply opening 96 and the supply gap 92, flows from there through the overflow channels 90 to the cavity 88 and from there, since it is designed to extend around the entire piston 16, can enter the afterflow bores 102 and flow into the inner space 106 of the piston 16.

Furthermore, a channel 110 leads from the hydraulic connection 100 to a hydraulic space 112 which is located on a side of the inner sealing element 60 facing away from the cylinder chamber 18 and is filled with hydraulic medium so that no air can enter the cylinder chamber 18 from a side of the inner sealing element facing away from the cylinder chamber 18 but rather only an exchange of hydraulic medium takes place in the case of a slight leakage.

The hydraulic space 112 extends as far as the outer piston section 38, with which the piston 16 is guided in the outer bore section 26, wherein a circumferential groove 114 is provided in the outer piston section 38 and the outer sealing element 120 is seated in this groove, likewise abuts on the base of the groove 114 with a supporting lip 124 proceeding from a base member 122 and abuts with a sealing lip 126 on the inner surface 128 of the outer bore section 26 in order to provide a seal between the hydraulic space 112 and the surroundings with air which adjoin the outer end side 52 of the piston 16.

The outer sealing element 120 can be moved with the piston 16 so that the sealing lip 126 slides along on the inner surface 128, wherein the hydraulic space 112 will become smaller when the piston 16 is moved in the direction of the cylinder chamber 18 and will become larger with movement in the direction away from the cylinder chamber 18.

Figure 7:
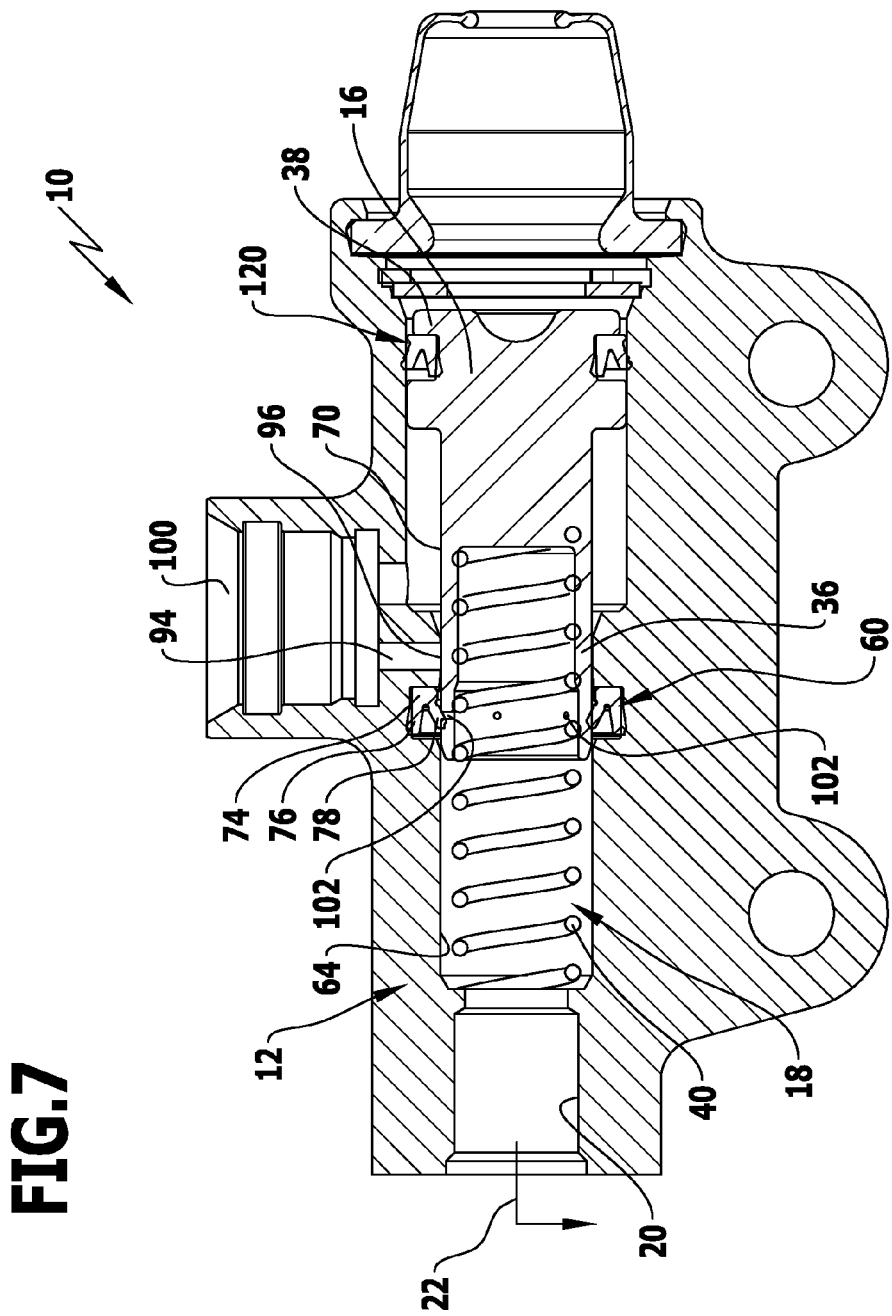
FIG. 7 shows an illustration similar to FIG. 1 of the master cylinder in the closed position.
Figure 8:
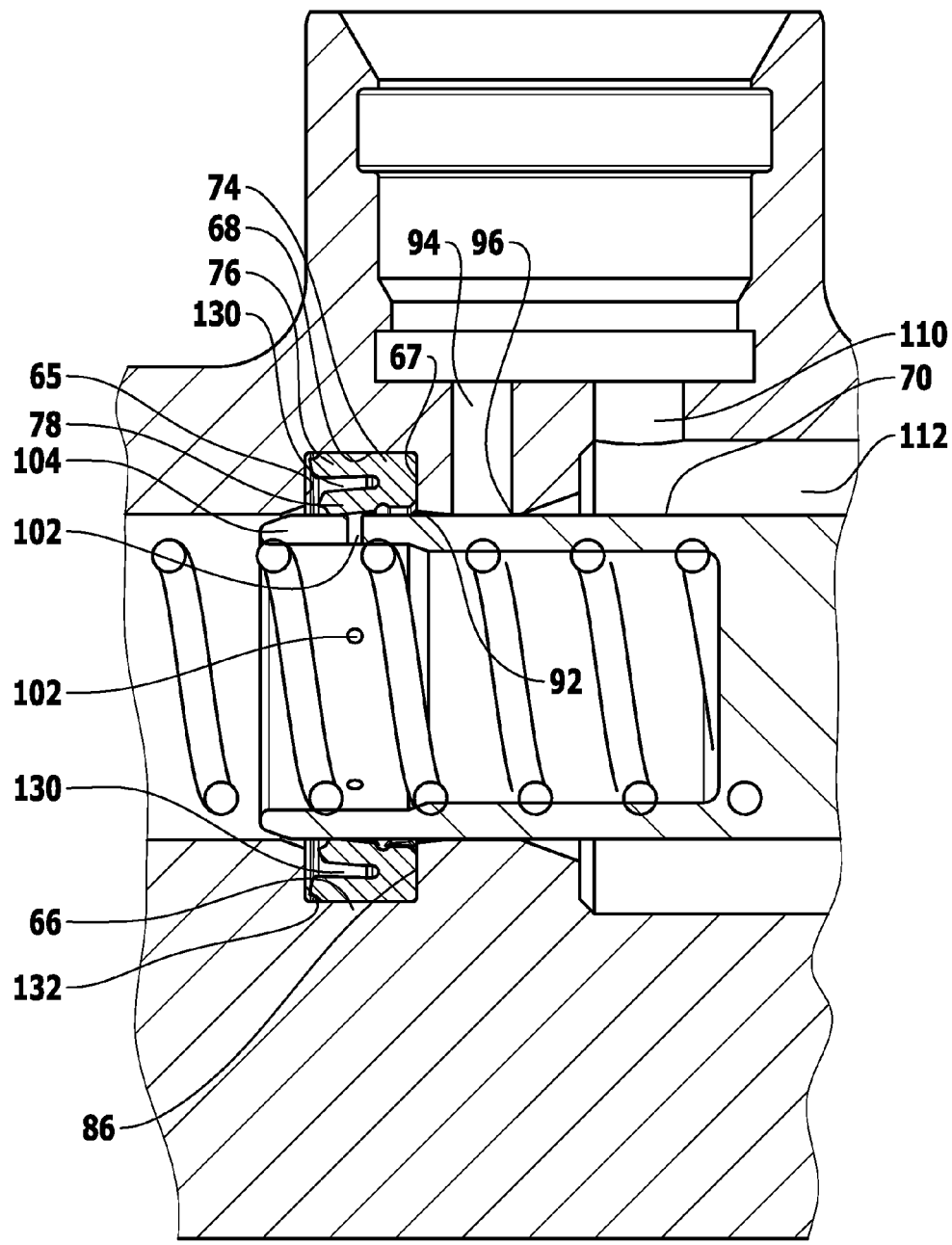
FIG. 8 shows an illustration similar to FIG. 2 of the master cylinder in the closed position.

In order to build up pressure in the cylinder chamber 18, the piston 16 is acted upon in the direction of the cylinder chamber 18 so that it moves in the direction of the cylinder chamber 18, as illustrated in FIGS. 6 and 7, wherein the afterflow bores 102 likewise migrate in the direction of the cylinder chamber 18 with the movement of the piston 16 and, in this respect, as illustrated in FIGS. 7 and 8, first reach a closed position, in which the sealing lip 78 closes the afterflow bores 102 with its sealing surface 80 so that once this closed position is reached the afterflow space 84 and the cylinder chamber 18 are separated from one another and an equalization of pressure as a result of hydraulic medium flowing on from the afterflow space is no longer brought about.

Figure 9:
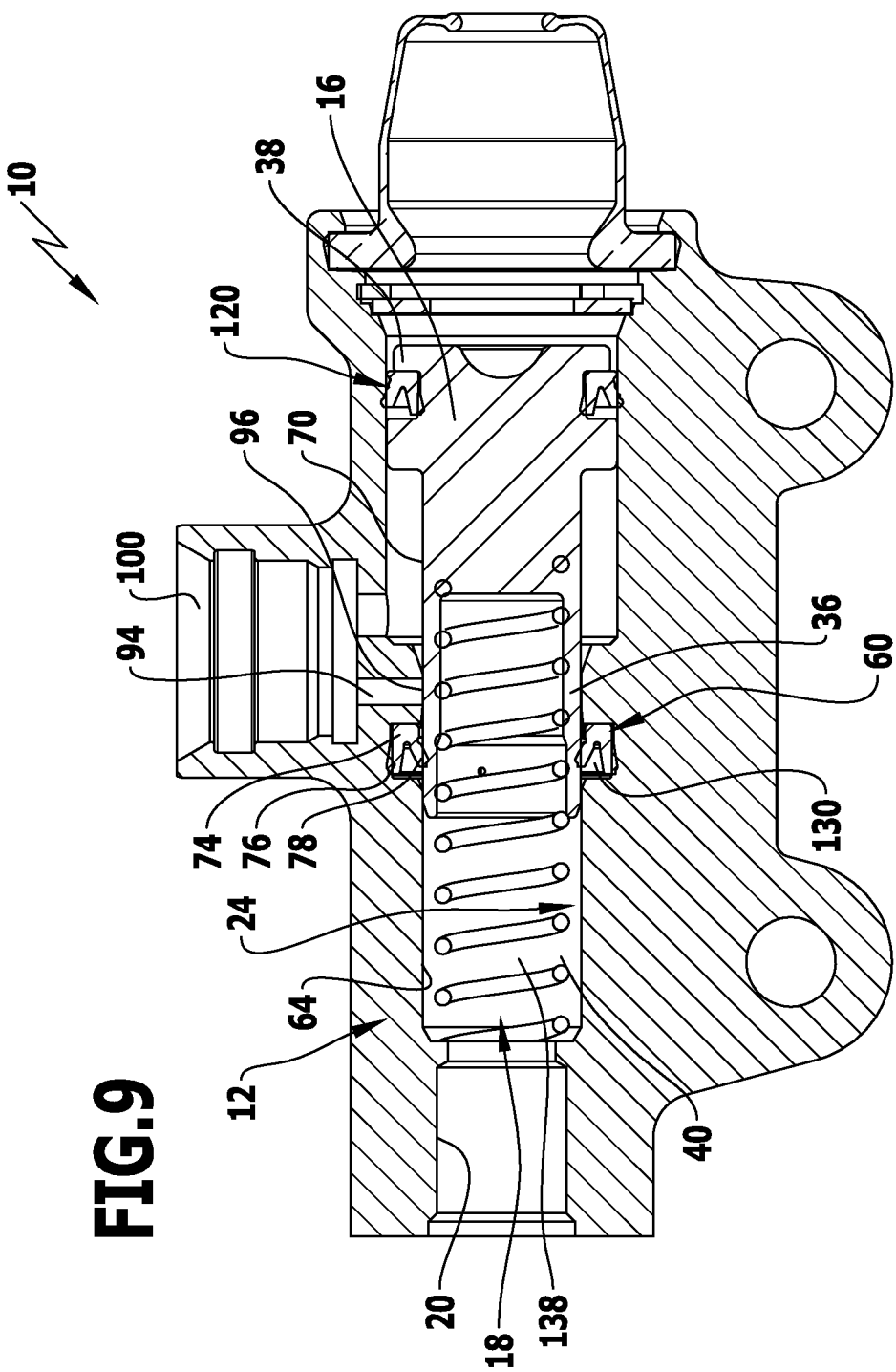
FIG. 9 shows an illustration similar to FIG. 1 of the master cylinder in the pressure position.
Figure 10:
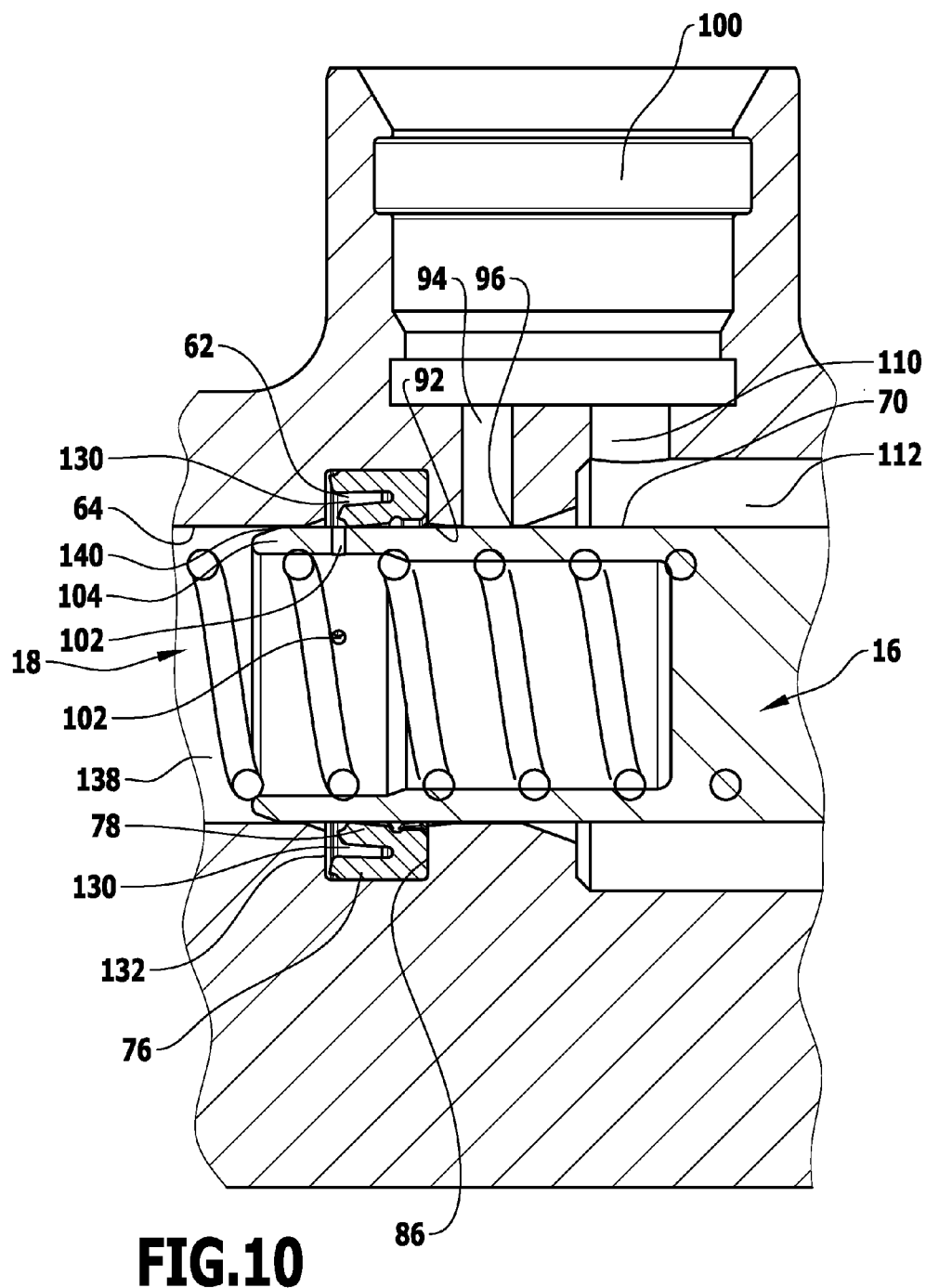
FIG. 10 shows an illustration similar to FIG. 2 of the master cylinder in the pressure position.

A further movement of the piston 16 in the direction of the cylinder chamber 18 leads to a further displacement of the afterflow bores 102 beneath the sealing lip 78 into a pressure position which is illustrated in FIGS. 9 and 10 and in which the afterflow bores 102 are located such that they open into an annular chamber 130 which is part of the cylinder chamber 18 and is located in the area of the annular groove 62 between a groove wall 132 located opposite the groove wall 86, the sealing lip 89 and the supporting lip 76, namely on a side of the sealing element 60 facing the cylinder chamber 18, wherein the annular chamber 130 is separated from a variable volume area 138 of the cylinder chamber 18 by a gap 140 forming between the piston skirt surface 70 and the inner surface 64 in the pressure position of the piston 16.

During further action on the piston 16, the afterflow bores 102 migrate into a position, in which they are covered by the inner surface 64 in the area of the gap 140 and are, therefore, no longer functionable.

When the action on the piston 16 decreases, this migrates again in the direction of the pressure equalization position on account of the effect of the force of the pressure spring 40, wherein the afterflow bores 102 again adjoin the annular chamber 130, first of all, and then run through under the sealing surface 80 of the sealing lip 78 until they are again in a pressure equalization position which is in communication with the afterflow chamber 84 and in which the afterflow bores 102 provide a connection between the afterflow space 84 and the cylinder chamber 18 in order to allow hydraulic medium to flow on into the cylinder chamber 18 for the purpose of equalizing pressure.

In the case where a considerable underpressure results in the cylinder chamber 18, the inner sealing element 60 is designed such that the sealing lip 78 has the possibility of lifting away from the piston skirt surface 70 or at least partially lifting away so that a larger cross section is available for hydraulic medium to flow on into the cylinder chamber 18 from the afterflow space 84 than is the case through the afterflow bores 102. As a result, it is possible to also compensate quickly for large hydraulic losses in the cylinder chamber 18 and equalize any underpressure in the cylinder chamber resulting during the movement of the piston 16 from the pressure position in the direction of the pressure equalization position.

Figure 12:
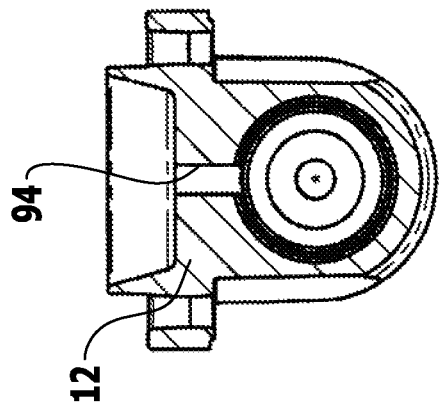
FIG. 12 shows a section along line 12-12 in FIG. 11.
Figure 11:
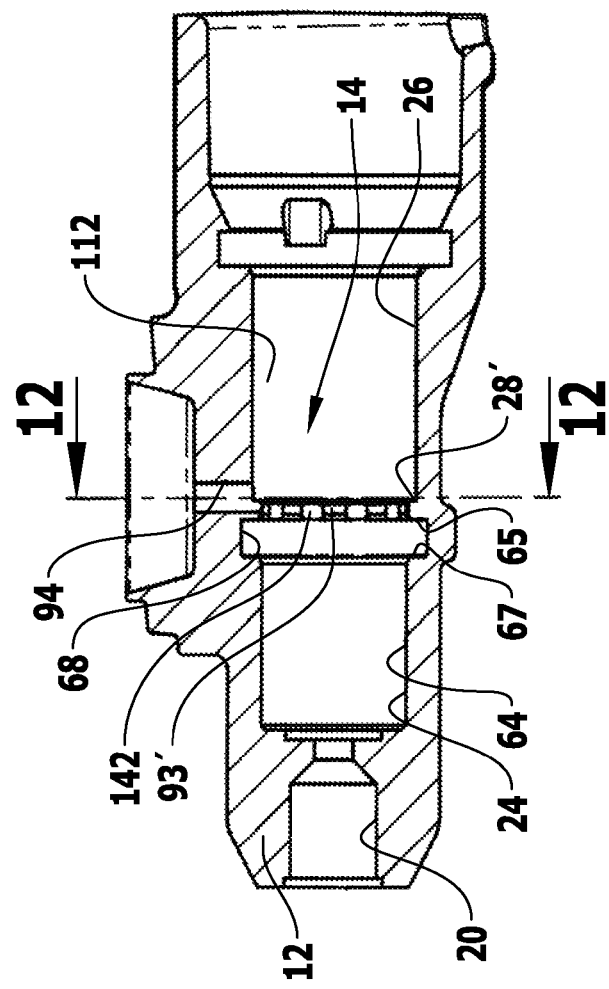
FIG. 11 shows a section similar to FIG. 2 through the cylinder housing of a second embodiment.

In a second embodiment, illustrated in FIGS. 11 and 12, of a master cylinder 10' according to the invention, those parts which are identical to those of the first embodiment are given the same reference numerals and so in this respect reference can be made in full to the comments on the first embodiment.

In contrast to the first embodiment, supply cutouts 142 are provided in the wall section 93' in the second embodiment instead of the gap 92 between the supply channel 94 and the afterflow space 84, wherein the wall section 93' extends as far as the step 28' and so hydraulic medium can enter the afterflow space 84 from the side of the hydraulic space 112.

In this respect, several supply cutouts 142 are preferably arranged around the piston 16 in the wall section 93' and, proceeding from the step 28, they have an ever decreasing depth with increasing extension in the direction of the cylinder chamber 18 proceeding from the cylindrical inner surface 64 and so the depth in the area of the groove wall 67 is minimal and, consequently, the sealing element 60 cannot be pressed into the supply cutouts 142.

Figure 13:
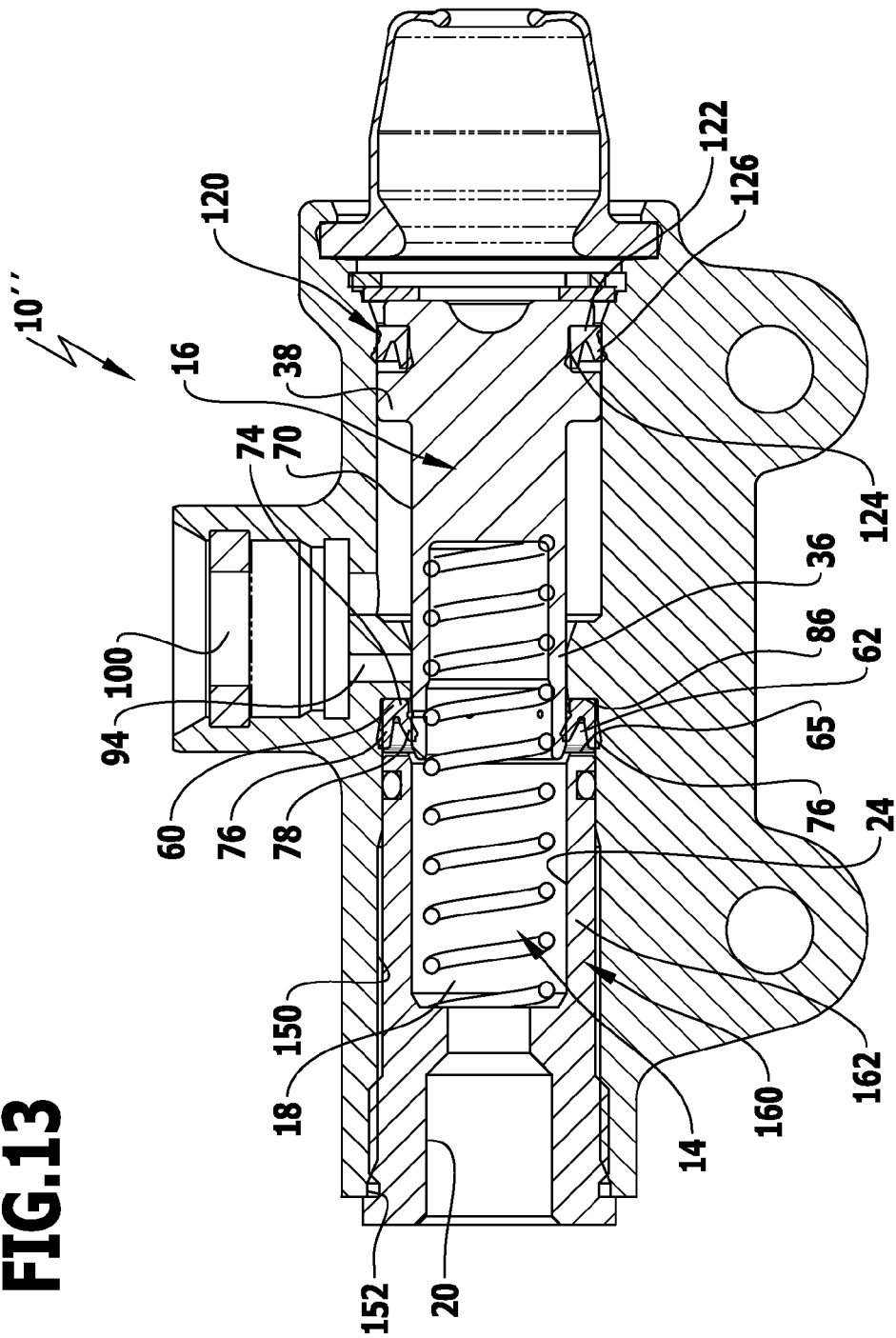
FIG. 13 shows an illustration similar to FIG. 1 of a third embodiment of a master cylinder according to the invention.

In a third embodiment of a master cylinder 10" according to the invention, illustrated in FIG. 13, those parts which are identical to those of the preceding embodiments are given the same reference numerals and so with respect to their description reference can be made in full to the comments on the first embodiment.

In contrast to the first embodiment, the receiving groove 62 is designed such that the groove wall 67 as well as the groove base 68 are formed in the housing 12 but the base 68 of the groove is a section of an insert bore 150 which leads from the groove wall 86 as far as an outer opening 152.

An insert designated as a whole as 160 can be inserted into this insert bore 150 and has, for its part, the groove wall 65 and forms with a sleeve member 162 the inner bore section 24 which surrounds the cylinder chamber 18 and into which the piston 16 can be moved with the inner piston section 36 for the purpose of taking up the pressure position.

Furthermore, the insert also accommodates the hydraulic connection 20 which opens into the cylinder chamber 18 on a side located opposite the piston 16.

The insert member 160 offers the possibility of inserting the sealing element 60 into the housing 12 in a simple manner via the opening 152 and of fixing it in place between the groove wall 86 and the groove wall 132 after insertion of the insert 160.

Figure 14:
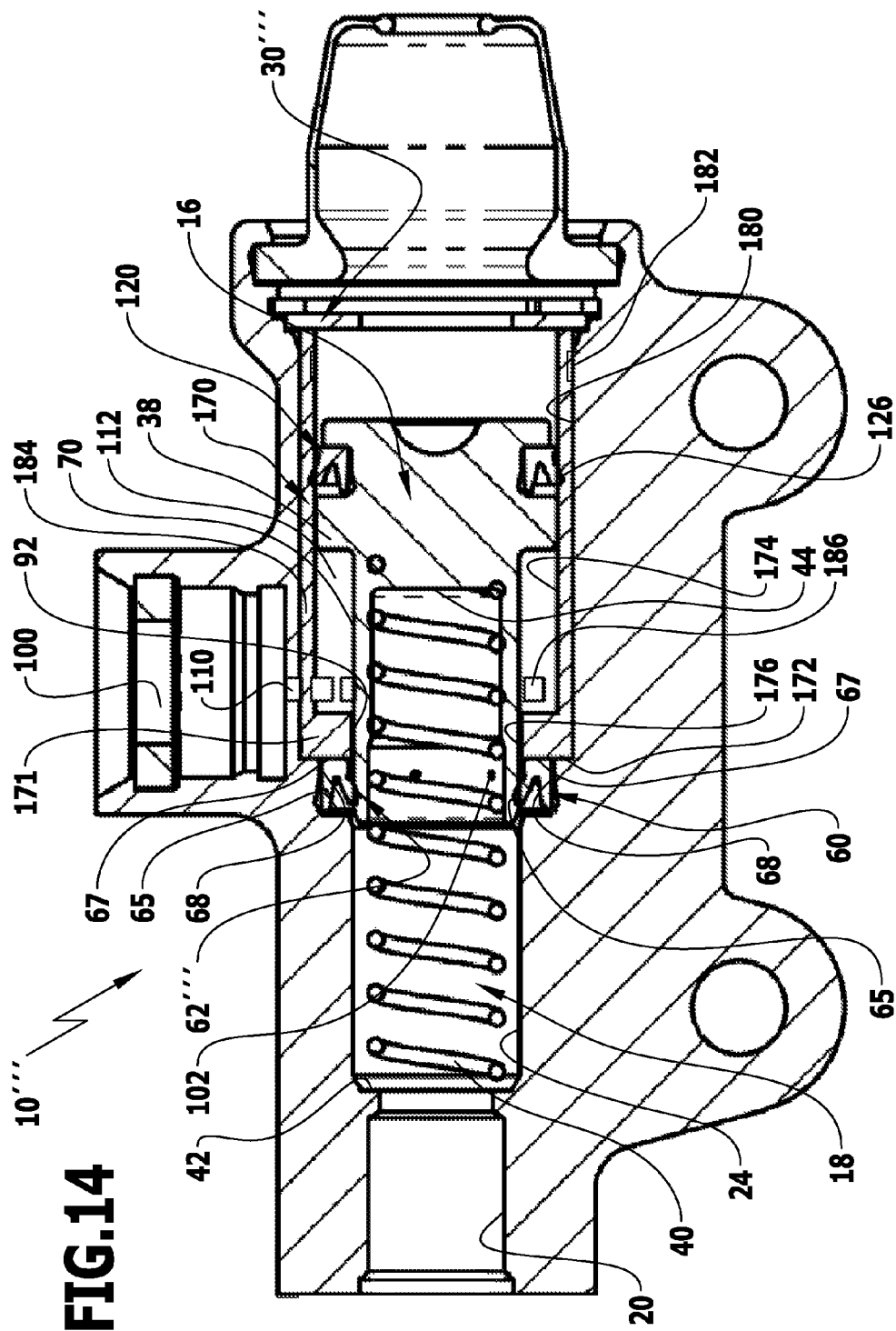
FIG. 14 shows an illustration similar to FIG. 1 of a fourth embodiment.

In a fourth embodiment of a master cylinder 10''' according to the invention, illustrated in FIG. 14, those parts which are identical to those of the preceding embodiments are given the same reference numerals and so with respect to the description of the remaining features reference can be made in full to the comments on the preceding embodiments.

In contrast to the preceding embodiments, the receiving groove 62" is designed such that the groove wall 65 and the groove base 68 are formed in the housing 12 but the groove wall 67 is formed by an end surface 172 of a sleeve-like insert designated as a whole as 170, the end surface being provided on an end flange 171.

The insert 170 is seated in an insert bore 180 which extends into the housing 12 from the outer opening 30''' on the side of the housing facing away from the cylinder chamber 18 and can be pushed into this insert bore 180 from the side of the opening 30''' and can be fixed in place in it in order to facilitate installation of the sealing element 60 via the outer opening 30'''.

The insert 170 is, for its part, provided in the area of the end flange 171 with a cylindrical recess 174, in which the piston 16 is guided with its outer piston section 38 in a comparable manner to that of the first embodiment in the wall section 93 of the inner bore section 24.

Furthermore, the piston 16 is guided in a guide recess 176 of the insert 170 in the area of the its piston skirt surface 70, namely adjoining the end surface 172, so that the hydraulic space 112 is sealed in relation to the cylinder chamber 18 by the sealing element 60 within the insert 170 as in the first and second embodiments.

Moreover, the piston 16 is also sealed relative to the cylindrical recess 174 by means of the sealing element 120 in the same way as a seal is brought about in relation to the outer bore section 26 in the first and second embodiments.

In order to avoid any leakage between the insert 170 and the insert bore 180, the insert 170 is also sealed relative to the insert bore 180 with a circumferential seal 182.

The supply of hydraulic medium to the hydraulic space 112 is brought about via the channel 110 and openings 186 provided in a wall 184 of the insert 170, wherein to allow hydraulic medium to run into the cavity 88 the guide recess 176 is likewise provided with a supply gap 92' which communicates with the afterflow space 84 in the same way as that already described in conjunction with the first embodiment.

In the fourth embodiment, the sealing element 60 can, therefore, be pushed first of all via the outer opening 30''' and the insert bore 180 as far as the base 68 of the groove and then be fixed in place in the completed groove 62" as a result of insertion of the insert 170 which forms the groove wall 67 so that the sealing element 60 can develop the same effect as in the preceding embodiments.

Figure 15:
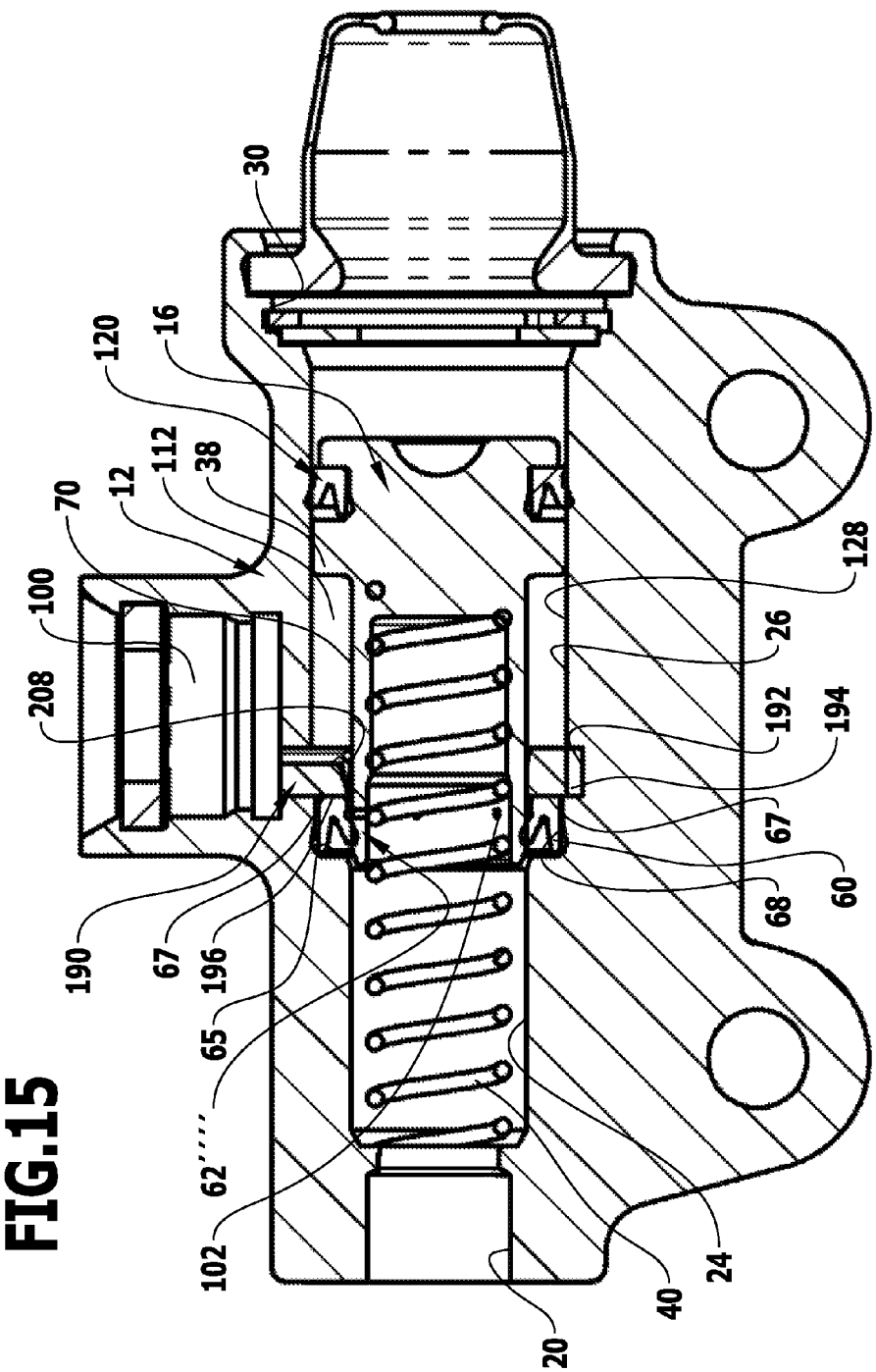
FIG. 15 shows an illustration similar to FIG. 1 of a fifth embodiment.
Figure 16:
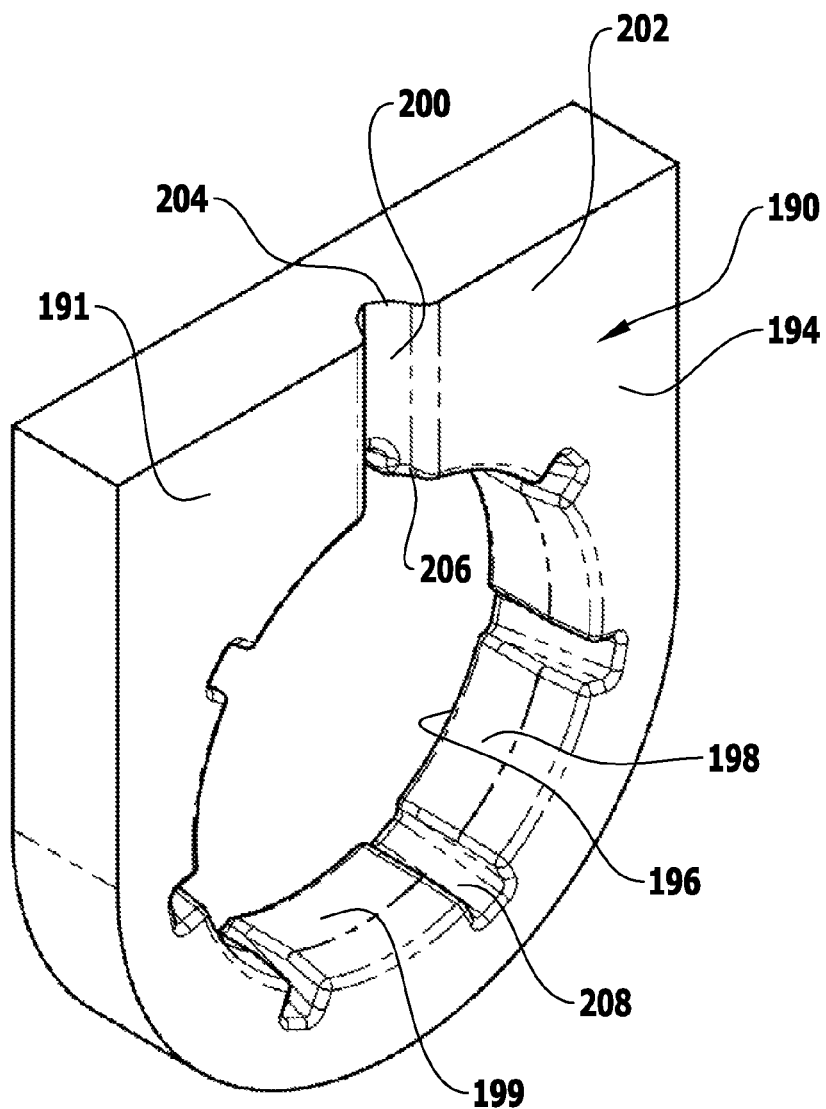
FIG. 16 shows a perspective illustration of a slide insert of the fifth embodiment.
Figure 17:
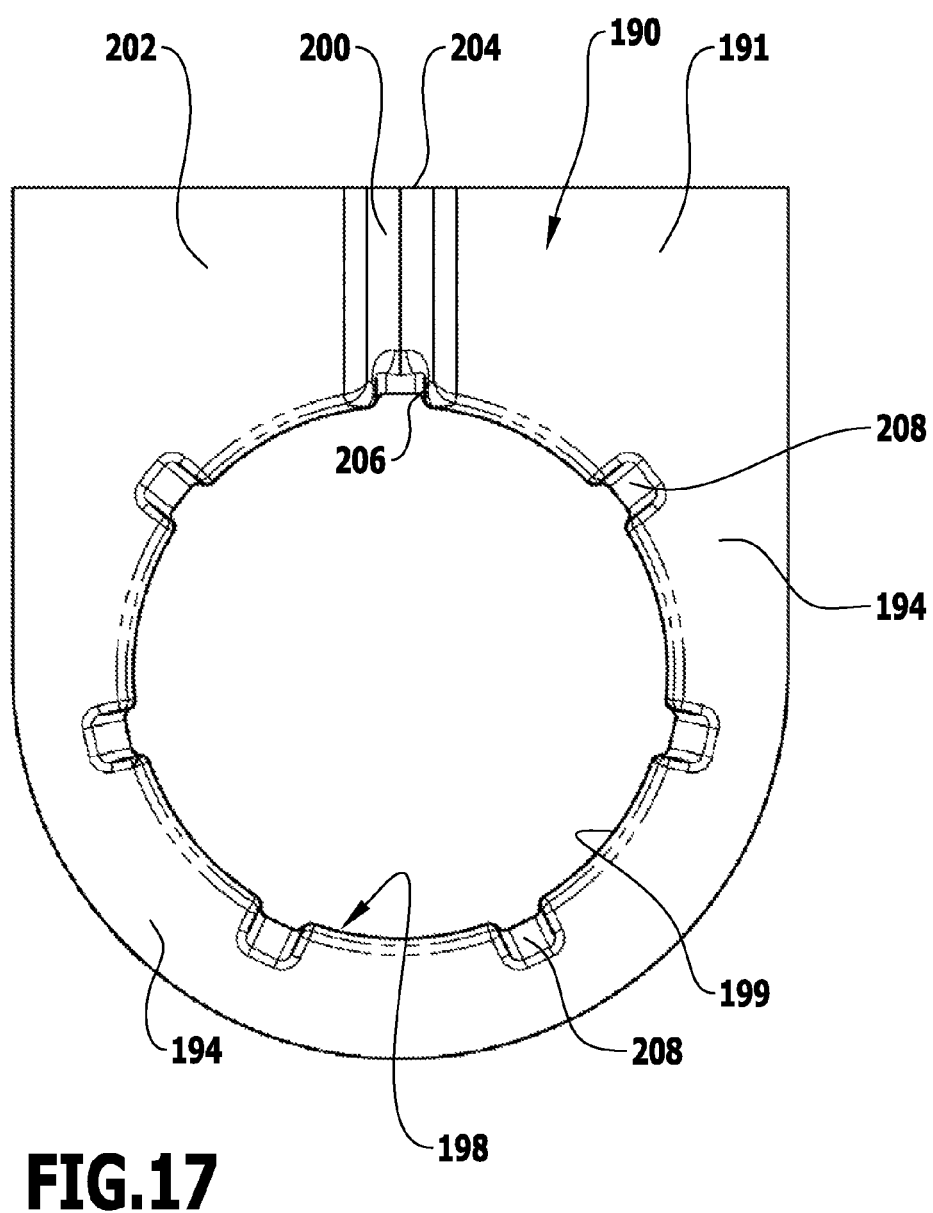
FIG. 17 shows an illustration of the slide insert according to FIG. 14 in a plan view in the direction of arrow X in FIG. 14

In a fifth embodiment of a master cylinder 10'''' according to the invention, illustrated in FIGS. 15 to 17, those parts which are identical to those of the preceding embodiments are given the same reference numerals and so with respect to the description of the remaining features reference can be made in full to the comments on these embodiments.

In contrast to the preceding embodiments, the receiving groove 62''' is limited on its side facing away from the cylinder chamber 18 in that the groove wall 67 is formed by a slide insert member 191 of a slide insert 190 which can be pushed into a slide insert receptacle 192 in the cylinder housing 12 via the hydraulic inlet 100 transversely to the direction of movement of the piston 16.

The slide insert receptacle 192 is preferably designed as a recess which extends even deeper into the cylinder housing 12 proceeding from the inner surfaces 128 of the outer bore section 26 in order to accommodate the slide insert 190 in the area of its edge regions 194.

The slide insert 190 preferably forms the groove wall 67 by means of a side surface 196 which faces the cylinder chamber 20 and lies adjacent to a guide recess 198 in the slide insert 190.

The guide recess 198 has the piston 16 passing through it when the slide insert 190 is installed in the cylinder housing 12 and guides the piston 16 in the area of the piston skirt surface 70 with a guide surface 199 at least in its pressure equalization position.

A supply of hydraulic medium via the hydraulic connection 100 is brought about by means of a channel 200 which is provided in the slide insert 190 and leads from a channel entry 204 to a channel exit 206, which is located in the guide recess 198, in an area 202 of the slide insert member 191 facing the hydraulic connection 100, wherein the channel exit 206 is preferably located in one of several supply cutouts 208 which all serve to supply hydraulic medium from the hydraulic space 112 to the afterflow space 84 and the cavity 88—as described in conjunction with the second embodiment—and are preferably arranged around the piston 16.

The supply cutouts 208 extend from the guide surface 199 in the direction of the afterflow space 84 and increasingly less deeply into the slide insert member 191 and have the same function as the supply cutouts 142 of the second embodiment.

In the fifth embodiment, as well, the installation of the sealing element 60 is made easier since this can be inserted via an outer opening 30 and via the outer bore 26, which lies adjacent to the opening and the cylindrical inner surface 128 of which preferably merges into the base 68 of the groove and thereby has the same cross sectional surface area as or a larger cross sectional surface area than the base 68 of the groove, as far as the base 68 of the groove so that a subsequent insertion of the slide insert 190 into the slide insert receptacle 192 secures the sealing element 60 in the receiving groove 62.

The master cylinder 10"" according to the fifth embodiment is then completed further by insertion of the piston 16 via the outer opening 30.

Figure 18:
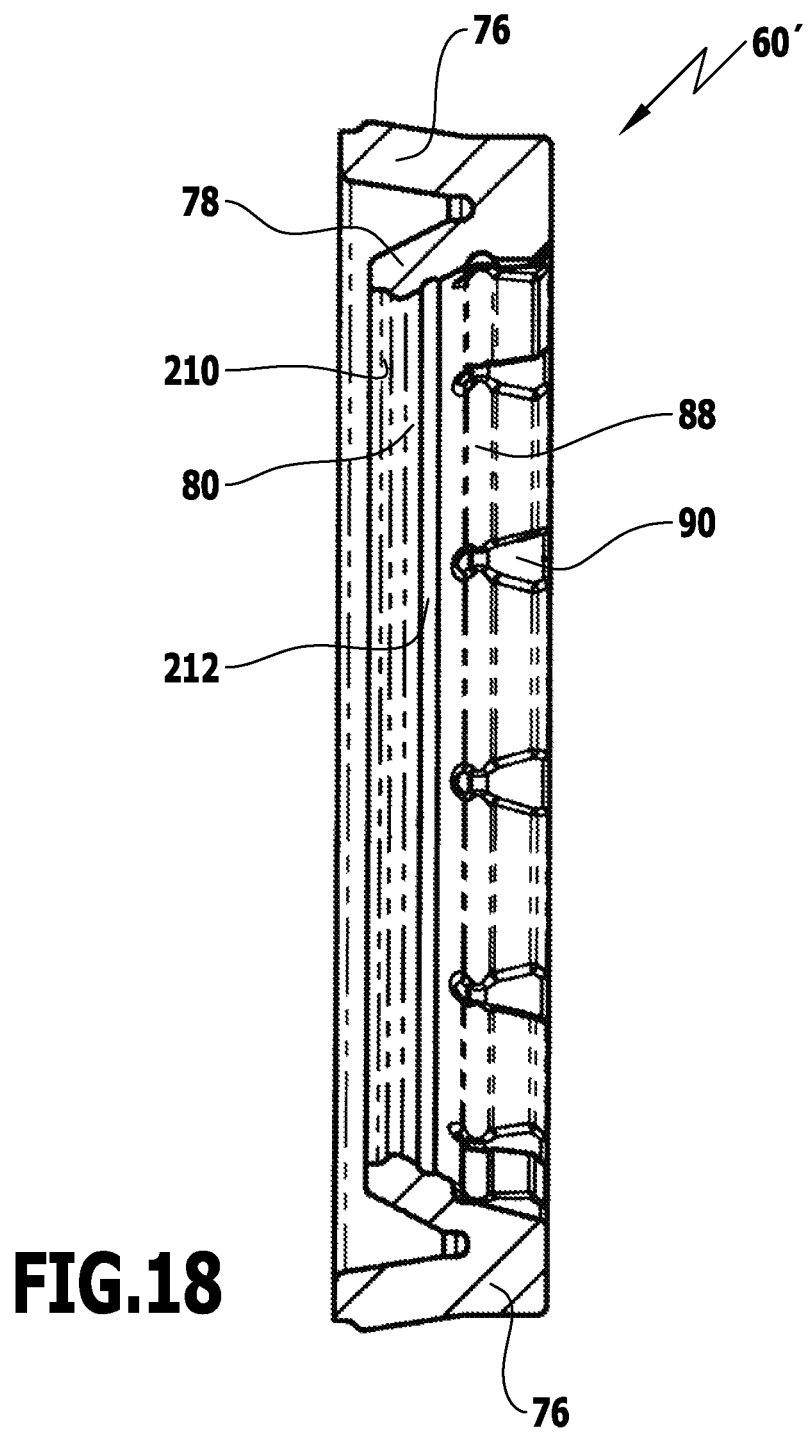
FIG. 18 shows a longitudinal section similar to FIG. 5 in a sixth embodiment.

In a sixth embodiment of a master cylinder according to the invention, illustrated in FIG. 18, the sealing element 60' is provided between the cavity 88 and a ridge 210 of the sealing surface 80 with a channel 212 which limits the sealing surface 80 of the sealing lip 78 which rests on the piston skirt surface 70 to an area between the ridge 210 and the channel 212 and, therefore, improves the sliding of the sealing lip 78 on the piston skirt surface 70.

Moreover, the channel 212 is dimensioned such that it holds hydraulic medium and acts in the manner of a lubricant pocket in order to ensure an easy sliding of the area of the sealing lip 78 located between the ridge 210 and the channel 212.

As for the rest, all the additional parts are identical to those of one of the preceding embodiments and so reference can be made in full to the comments in conjunction with these embodiments.

The invention claimed is:

1. Master cylinder for a clutch, actuating or brake system of a vehicle, comprising:
    a cylinder housing with a piston bore,
    a piston arranged in the piston bore and having an end side facing a cylinder chamber and at least one afterflow opening leading from a cylindrical piston skirt surface to the cylinder chamber at a distance from the end side, said at least one afterflow opening adjoining an afterflow space in a pressure equalization position of the piston so that in the pressure equalization position hydraulic medium can run on into the cylinder chamber in order to equalize the pressure, and
    an inner sealing element arranged between the housing and the piston in the area of the piston bore and limiting the cylinder chamber, the afterflow space being arranged between the sealing element and the piston skirt surface on a side of a sealing lip of the sealing element facing away from the cylinder chamber and wherein in the pressure equalization position the at least one afterflow opening is arranged so as to be located opposite an inner surface area of the sealing element limiting the afterflow space;
    wherein an entire axial length of the piston skirt surface with which the sealing lip interacts has a constant outer radius;
    wherein the inner sealing element has an axial free end spaced away from a contact portion of the sealing lip that contacts the piston skirt surface, the inner surface area is positioned axially between the axial free end and the contact portion, the inner surface area is spaced radially outward from the piston skirt surface for formation of at least part of the afterflow space therebetween, the sealing lip being configured such that the at least one afterflow opening maybe positioned axially between the axial free end and the contact portion with the at least one afterflow opening being entirely uncovered by the inner sealing element and entirely exposed to the afterflow space;
    wherein an imaginary smooth annular surface may be constructed which extends axially from the axial free end to the contact portion of the sealing lip, wherein at least a portion of the inner surface area coincides with the imaginary smooth annular surface, the inner surface area including an annular cavity which is recessed with respect to the imaginary smooth annular surface such that the annular cavity forms a continuous groove around a circumference of the inner surface area; and
    wherein the inner surface area further includes overflow channels recessed with respect to the imaginary smooth annular surface such that the overflow channels extend axially from the annular cavity toward the axial free end.

2. Master cylinder as defined in claim 1, wherein the overflow channels extend approximately parallel or spirally or helically in relation to a direction of movement of the piston.

3. Master cylinder as defined in claim 1, wherein the afterflow space lies adjacent to a supply recess located between the piston skirt surface and the piston bore.

4. Master cylinder as defined in claim 3, wherein the supply recess varies in a radial direction towards the afterflow space.

5. Master cylinder as defined in claim 3, wherein the supply recess communicates with a supply channel.

6. Master cylinder as defined in claim 1, wherein the axial free end of the sealing element comprises an annular base member annular base member.

7. Master cylinder as defined in claim 6, wherein a supporting lip located radially outwards extends from the annular base member in the direction of the cylinder chamber.

8. Master cylinder as defined in claim 6, wherein proceeding from the base member a sealing lip located radially inwards extends in the direction of the cylinder chamber.

9. Master cylinder as defined in claim 8, wherein the sealing lip located radially inwards is of a flexible design.

10. Master cylinder as defined in claim 8, wherein the sealing lip abuts on the piston skirt surface radially inwards with elastic pretensioning.

11. Master cylinder as defined in claim 6, wherein the afterflow space arranged between the sealing element and the piston skirt surface extends in the area of the base member.

12. Master cylinder as defined in claim 8, wherein the afterflow space extends as far as the sealing lip.

13. Master cylinder as defined in claim 8, wherein the sealing lip has such a pretensioning that it allows hydraulic medium to flow through from the afterflow space to the cylinder chamber by at least partially lifting away from the piston skirt surface in the case of any underpressure in the cylinder chamber.

14. Master cylinder as defined in claim 1, wherein the piston is positioned in a closed position with the afterflow openings at such a distance from the pressure equalization position that the afterflow openings are covered by a sealing surface of the inner sealing lip.

15. Master cylinder as defined in claim 1, wherein in a pressure position the piston is displaced to such an extent in the direction of the cylinder chamber that the afterflow openings are located on a side of the sealing lip facing the cylinder chamber.

16. Master cylinder as defined in claim 15, wherein when the piston is in the pressure position a gap is present between an inner surface of the cylinder chamber and the piston skirt surface and separates an annular chamber of the cylinder chamber adjoining the sealing element from a variable volume area of the cylinder chamber.

17. Master cylinder as defined in claim 16, wherein the gap between the inner surface of the cylinder chamber and the piston skirt surface is minimal in all the positions of the piston between the pressure position and a closed position.

18. Master cylinder as defined in claim 1, wherein it interacts with a regulated clutch or brake system.

19. Master cylinder as defined in claim 1, wherein it is actuatable by hand or by foot.

20. Master cylinder as defined in claim 1, wherein the afterflow opening leads from the piston skirt surface through a piston wall to the cylinder chamber.

* * * * *